(12) United States Patent
Bonnett (10) Patent No.: US 9,203,637 B2
(45) Date of Patent: Dec. 1, 2015

(54) AUTOMATED AUDIO STREAM TESTING

(75) Inventor: Brian Bonnett, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1916 days.

(21) Appl. No.: 11/611,605

(22) Filed: Dec. 15, 2006

(65) Prior Publication Data

US 2008/0146217 A1  Jun. 19, 2008

(51) Int. Cl.
*G06F 15/173* (2006.01)
*H04L 12/26* (2006.01)
*H04M 3/22* (2006.01)

(52) U.S. Cl.
CPC ............ *H04L 12/2697* (2013.01); *H04L 43/50* (2013.01); *H04M 3/2236* (2013.01)

(58) Field of Classification Search
USPC .......................................... 709/224; 455/424
See application file for complete search history.

(56) References Cited

U.S. PATENT DOCUMENTS

| 6,434,198 | B1* | 8/2002 | Tarraf | 375/259 |
|---|---|---|---|---|
| 6,801,939 | B1* | 10/2004 | Chafe | 709/224 |
| 2005/0054380 | A1* | 3/2005 | Michaelis | 455/557 |
| 2005/0137838 | A1* | 6/2005 | Medlyn | 703/13 |
| 2005/0232411 | A1* | 10/2005 | Srinivasan et al. | 379/413 |
| 2006/0093094 | A1* | 5/2006 | Xing et al. | 379/1.02 |
| 2006/0178115 | A1* | 8/2006 | Vayssiere | 455/90.2 |

* cited by examiner

*Primary Examiner* — Umar Cheema (57) ABSTRACT

A device translates a script command related to audio streaming in a network, and generates or receives an audio stream based on the translated script to test the network.

25 Claims, 6 Drawing Sheets

AUTOMATED AUDIO STREAM TESTING

BACKGROUND INFORMATION

A communication device of a system (e.g., a telecommunications system) may be tested to determine whether the communication device is functioning properly. Some communication devices may provide audio signals during normal operation. Testing the audio signals of such communication devices may typically be a manual and time consuming task.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may provide automated audio streaming to permit near real-time functional testing of audio provided in a network and/or by communication devices within the network. The systems and methods may implement the automated audio streaming within an interactive testing platform (ITP) system that may test the performance of the network. The automated audio streaming may permit a tester or user to hear signals and/or audio cues or prompts provided by the network and/or communication devices of the network being tested. This may permit quick diagnosis of any problems encountered in a test, as well as rapid test case creation by the ITP system based on the generated audio cues.

Figure 1:
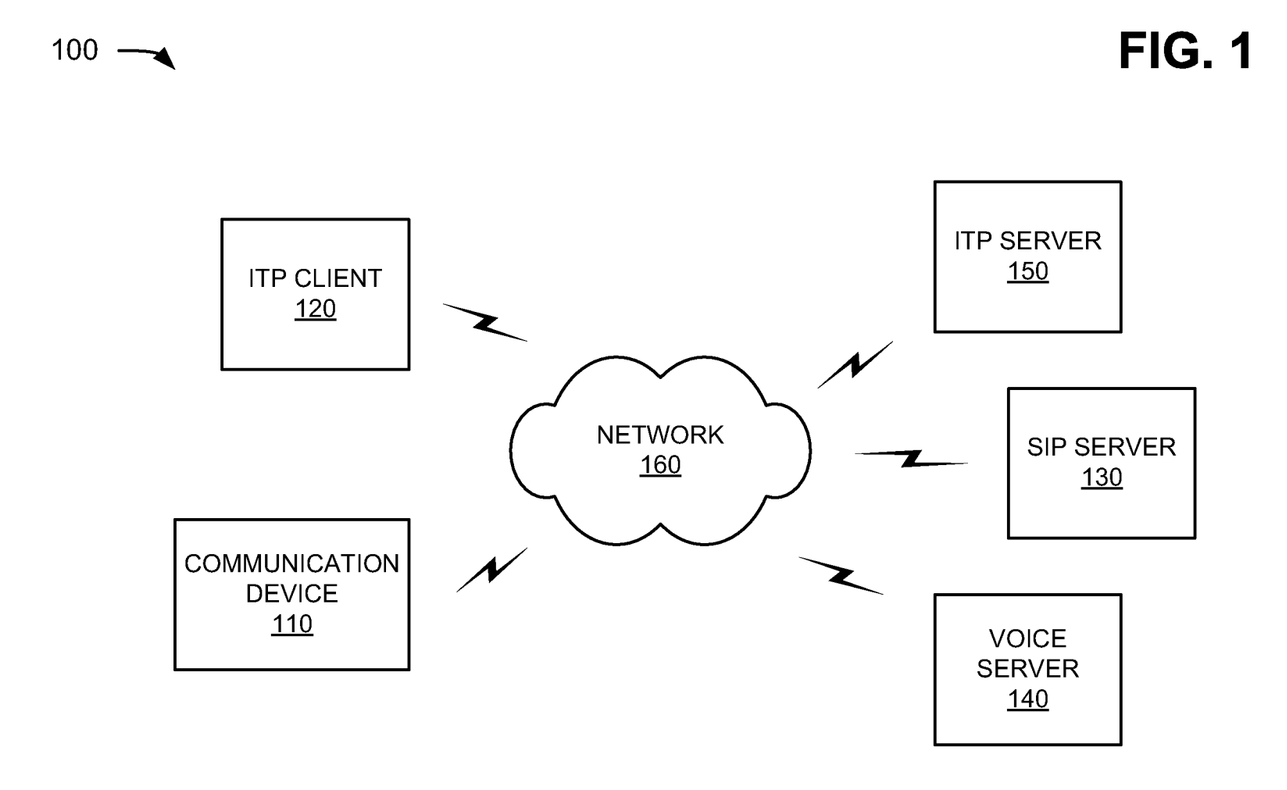
FIG. 1 depicts an exemplary network in which systems and methods described herein may be implemented.

FIG. 1 is a diagram of an exemplary network 100 in which systems and methods described herein may be implemented. Network 100 may include a communication device 110 and an ITP client 120 connected to multiple servers (e.g., a Session Initiation Protocol (SIP) server 130, a voice server 140, and an ITP server 150) via a network 160. Network 160 may include a local area network (LAN), a wide area network (WAN), a telephone network, such as the Public Switched Telephone Network (PSTN), an intranet, the Internet, or a combination of networks.

Communication device 110, ITP client 120, and servers 130-150 may connect to network 160 via wired, wireless, and/or optical connections. One communication device 110, one ITP client 120, and three servers 130-150 have been illustrated as connected to network 160 for simplicity. In practice, there may be more or fewer communication devices, ITP clients, and servers. Also, in some instances, a communication device may perform one or more functions of a server and/or a server may perform one or more functions of a communication device. In other instances, an ITP client may perform one or more functions of a server and/or a server may perform one or more functions of an ITP client.

Communication device 110 may include a device, such as a personal computer, a SIP telephone, a wireless telephone, a personal digital assistant (PDA), a laptop, a device capable of providing audio, an interface device capable of providing audio (e.g., telephone, SIP, International Telecommunication Union (ITU) Signaling System 7 (SS7), Real-time Transport Protocol (RTP), T1/E1, and/or analog based line interfaces), or another type of computation or communication device, a thread or process running on one of these devices, and/or an object executable by one of these devices. In one implementation, for example, communication device 110 may include the features set forth in co-pending application Ser. No. 11/611,582, entitled "AUTOMATED SESSION INITIATION PROTOCOL (SIP) DEVICE," filed on the same date herewith, the disclosure of which is incorporated by reference herein in its entirety. In another implementation, communication device 110 may include the features set forth in co-pending application Ser. No. 11/611,529, entitled "AUTOMATED TELETYPE (TTY) TESTING," filed on the same date herewith, the disclosure of which is incorporated by reference herein in its entirety.

ITP client 120 may include client devices that may permit testing of network 100 and/or devices connected to network 100 (e.g., communication device 110, SIP server 130, voice server 140, etc.). A client device may be defined as a device, such as a personal computer, a wireless telephone, a PDA, a laptop, or another type of computation or communication device, a thread or process running on one of these devices, and/or an object executable by one of these devices.

SIP server 130, also commonly referred to as a network server, may include a device that facilitates the establishment of SIP calls. A "SIP call," as the term is used herein, is to be broadly interpreted to include any out-of-dialog or dialog-establishing SIP method (e.g., a SIP INVITE request, a SIP SUBSCRIBE request, a SIP REFER request, a SIP OPTIONS request, a SIP MESSAGE request, a SIP REGISTER request, etc.). SIP server 130 may act as both a server and a client for the purpose of making requests on behalf of other clients. Requests may be serviced internally or by passing them on, possibly after translation, to other servers. SIP server 130 may interpret, and, if necessary, rewrite a request message before forwarding it.

Voice server 140 may include server entities that are capable of facilitating network-based communications, e.g., telephone calls, Internet-based telephone calls, multimedia distribution, multimedia conferences, instant messaging conferences, interactive voice response (IVR), automated and manual operator services, automatic call distribution, call routing, etc. Voice server 140 may also include T1, E1, and SS7 interface cards that are capable of facilitating in-band, Primary Rate Interface (PRI), and SS7 signaling methods.

ITP server 150 may include server entities that may permit testing of network 100 and/or devices connected to network 100 (e.g., communication device 110, SIP server 130, voice server 140, etc.). For example, ITP server 150 may provide automated audio streaming to permit near real-time functional testing of audio provided in a network (e.g., network 100) and/or by communication devices within the network. In one implementation, ITP server 150 may generate an audio stream that may permit a network tester to hear signals and/or audio cues provided by the network and/or communication devices of the network being tested. This may permit quick diagnosis of any problems encountered in a test, as well as rapid test case creation by ITP server 150 based on the generated audio cues. Additional details of ITP server 150 are provided below in connection with FIG. 3.

ITP server 150 may control tests designed to exercise network devices, such as communication device 110. ITP server 150 may communicate with network 160 to perform the tests and may present the resulting information to a user. ITP server 150 may permit a user to edit and/or view the executable content of the test cases through a user interface, as well as define and edit scripts for the test cases. The test cases may include a defined purpose and a script that controls execution of the test over network 160. The script, for example, may contain commands to initiate an audio stream over network 160. The script commands may enable construction of messages (e.g., audio streams) and may permit call control that may resemble live network traffic.

ITP server 150 (or in cooperation with other ITP servers or other devices, e.g., ITP client 120) may execute script defined for a test case. ITP server 150 may perform several operations when it receives a script execution request. ITP server 150 may retrieve the script from a database, and may report any problems retrieving the script from the database. ITP server 150 may extract data origination and termination resources defined by the test case. ITP server 150 may connect with voice server 140 to allocate the defined resources. ITP server 150 may also connect to hardware servers using the resource information acquired from voice server 140. The method by which the script uses the applicable resources may affect the resource configuration (e.g., resources used to originate calls may be configured differently from those used to terminate calls). If resources are available to ITP server 150 for real-time control, ITP server 150 may execute the script and continue until a result has been reached, at which point connections to the hardware servers may be terminated, the allocated resources may be freed in voice server 140, and the test results may be generated by ITP server 150. Throughout this process, data elements may be passed from ITP server 150 to an ITP client device (e.g., ITP client 120) in order to update the user regarding the tests in progress.

Although FIG. 1 shows exemplary components of network 100, in other implementations, network 100 may contain fewer or additional components that may permit network testing. In still other implementations, one or more components of network 100 may perform the tasks performed by other components of network 100.

While servers 130-150 are shown as separate entities, it may be possible for one or more of servers 130-150 to perform one or more of the functions of another one or more of servers 130-150. For example, it may be possible that two or more of servers 130-150 are implemented as a single server. It may also be possible for a single one of servers 130-150 to be implemented as two or more separate (and possibly distributed) devices.

Although implementations are described below in the context of a network that supports devices capable of producing audio, in other implementations, equivalent or analogous communication protocols and/or types of transport networks (e.g., asynchronous transfer mode (ATM), frame relay, etc.) may be used. Both the ITU H.323 standard and the IETF's SIP are examples of protocols that may be used for establishing a communications session among terminals, such as communication device 110, connected to a network. Although audio based protocols are shown for convenience, any type of protocol or a mixture of such protocols may be applied in various parts of the overall system.

Figure 2:
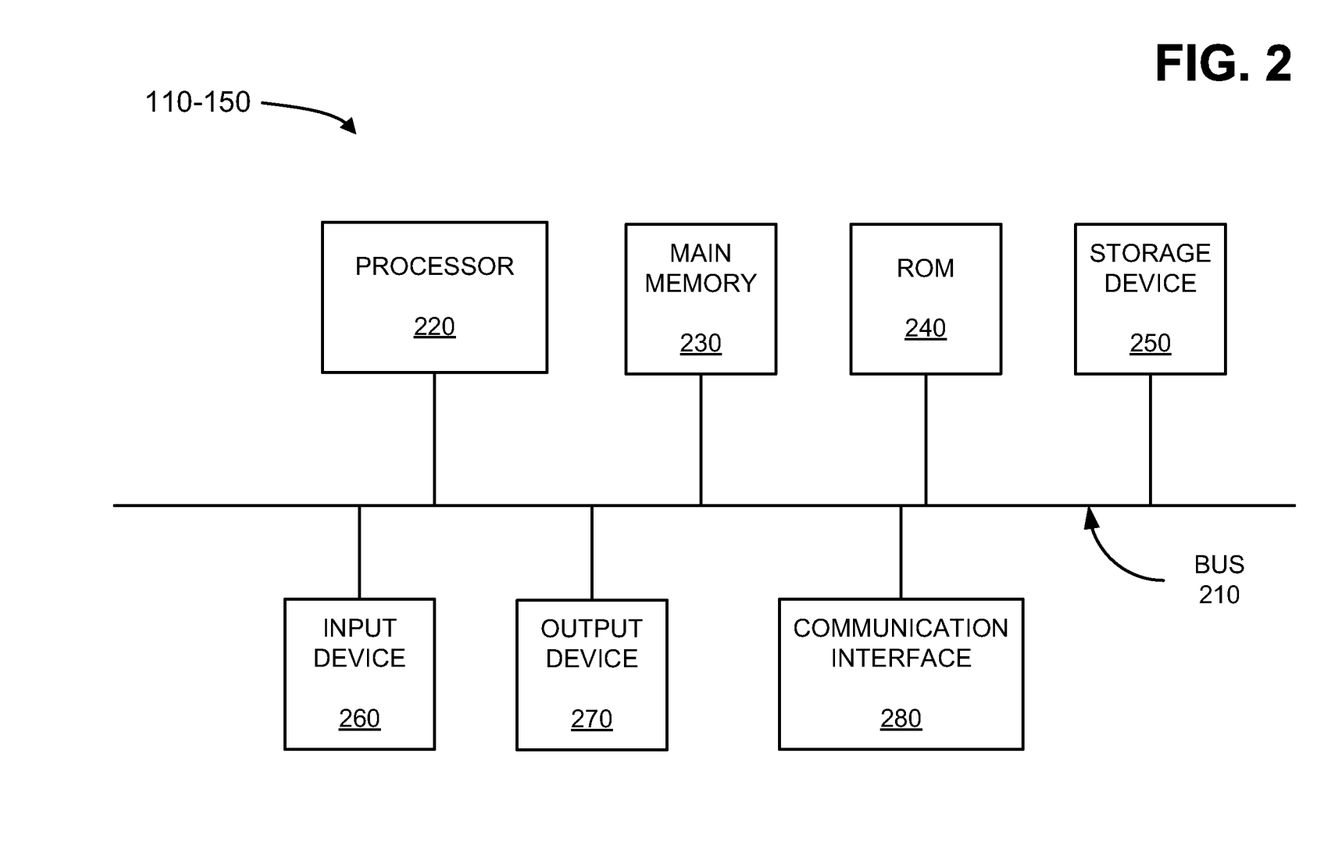
FIG. 2 depicts an exemplary device, client or server, configured to communicate via the exemplary network of FIG. 1.

FIG. 2 is an exemplary diagram of a client or server entity (hereinafter called "client/server entity"), which may correspond to one or more of communication device 110, ITP client 120, or servers 130-150. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 160.

As will be described in detail below, the client/server entity may perform certain operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the client/server entity, in other implementations, the client/server entity may contain fewer or additional components. In still other implementations, one or more components of the client/server entity may perform the tasks performed by other components of the client/server entity.

An ITP system may include several servers (e.g., a script server that may create script, a script execution server that may execute script, etc.) that may interoperate in the execution of testing network 100 for audio streaming functionality. In one implementation, for example, the ITP system may include the features set forth in co-pending application Ser. No. 11/611,560, entitled "DISTRIBUTED VOICE QUALITY TESTING," filed on the same date herewith, the disclosure of which is incorporated by reference herein in its entirety.

Figure 3:
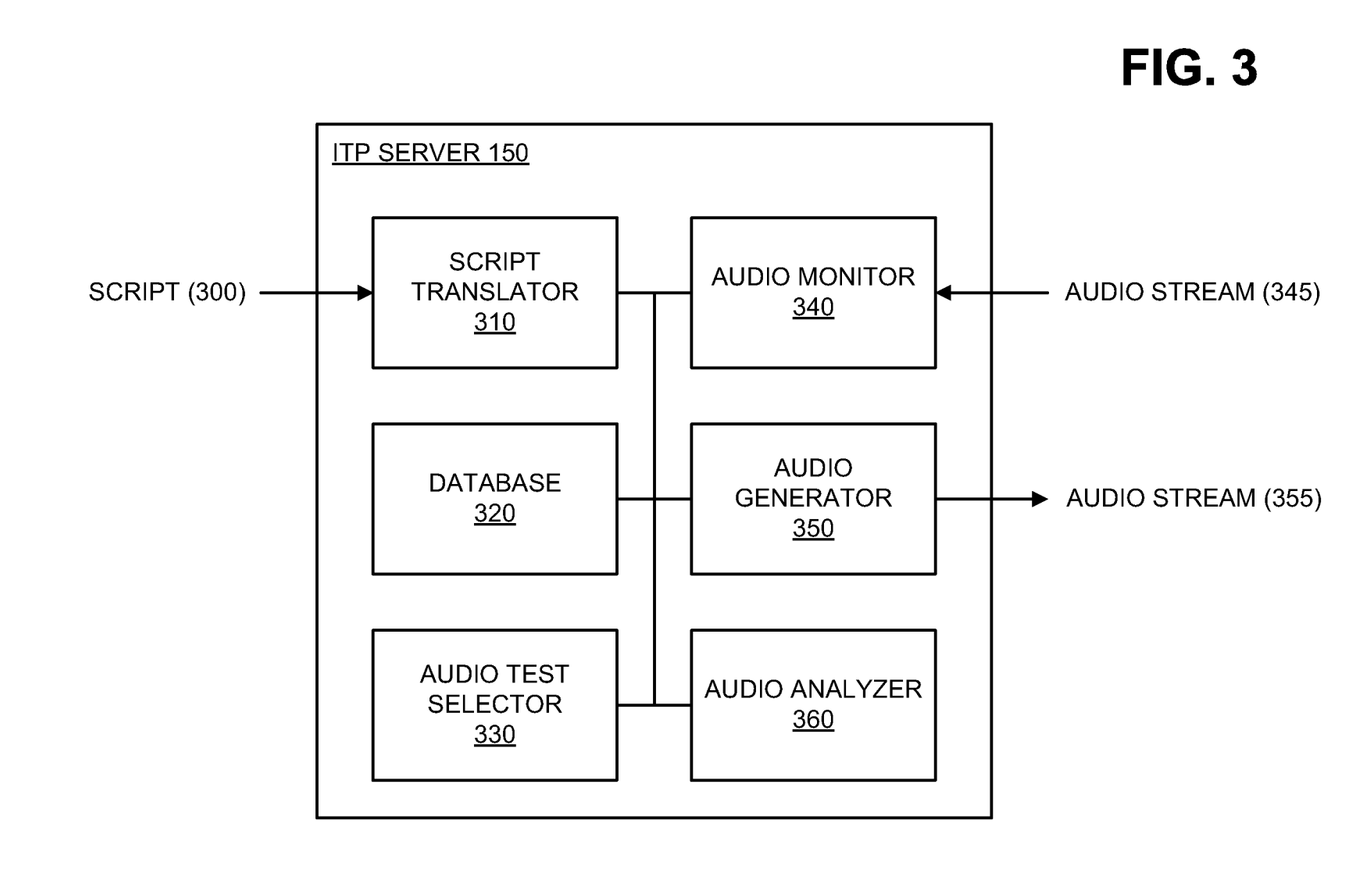
FIG. 3 is an exemplary functional diagram of an interactive testing platform (ITP) server of the exemplary network shown in FIG. 1.

FIG. 3 is an exemplary functional diagram of one such ITP server, i.e., ITP server 150 of exemplary network 100. Generally, ITP server 150 may translate script commands (e.g., Visual Basic style script commands) into audio streaming related information, and/or may evaluate the results of the audio streaming-based tests. As shown, ITP server 150 may include a variety of components. For example, ITP server 150 may include a script translator 310, a database 320, an audio test selector 330, an audio monitor 340, an audio generator 350, an audio analyzer 360, etc.

Script translator 310 may receive a script command(s) 300 from the ITP system (e.g., from a script server (not shown) of the ITP system), and may translate script command(s) 300 into information capable of automatically generating and testing an audio stream with a network device, such as communication device 110. Script command(s) 300 may include commands for the creation of audio streaming-based test cases for, e.g., network 100. Script command(s) 300 may also define which physical devices of the network may be used, and may assign names to the physical devices. For example, script command(s) 300 may include test commands that permit ITP server 150 to generate an audio stream (e.g., via audio generator 350), test commands that permit ITP server 150 to receive an audio stream (e.g., via audio monitor 340), test commands that cause ITP server 150 to analyze the received audio stream (e.g., via audio analyzer 360), etc.

Script translator 310 may utilize database 320 to aid in the translation of script command(s) 300. In one implementation, database 320 may correspond to main memory 230, ROM 240, storage device 250, or combinations of the aforementioned (see FIG. 2). In another implementation, database 320 may be external to ITP server 150 and may be accessed via, e.g., communication interface 280. Database 320 may provide information enabling devices of network 100 to reference specific Internet Protocol (IP) address/port combinations for communication with specific network devices (e.g., other ITP servers, ITP client 120, etc.) being used. Database 320 may also provide a reference to voice server 140.

Audio test selector 330 may provide a user with a variety of test-related options. For example, audio test selector 330 may enable a user to determine what device (e.g., communication device 110) of network 100 to test, what test case to perform on the determined device, whether the user wants to hear an audio stream as part of the determined test case, etc. In one exemplary implementation, if a user selects an audio stream-based test, the user may be presented with a check box indicating whether or not the user wishes to hear the audio stream. If the user wishes to hear the audio stream, audio test selector 330 may provide this information along with test case information to a script server of the ITP system, and the script server may generate script command(s) 300 corresponding to the audio stream and test case information. If the test is performed, audio test selector 330 may receive information about the device sending the audio stream (e.g., what other devices of network 100 that connect to the device sending the audio stream). Audio test selector 330 may also enable ITP server 150 to connect directly or indirectly (e.g., through other devices of network 100) to the device sending the audio stream.

Alternatively or additionally, audio test selector 330 may be provided in ITP client 120, and ITP client 120 may perform the aforementioned functions performed by audio test selector 330 alone or in cooperation with ITP server 150.

Audio monitor 340 may utilize the translated script command(s) 300 to monitor and/or capture an incoming real-time audio stream 345. Audio monitor 340 may also report audio stream 345 to other components of ITP server 150 to enable evaluation of audio stream 345. The method of monitoring and/or capturing audio stream 345 performed by audio monitor 340 may depend upon the type of audio network interface of the network device generating audio stream 345. For example, an audio stream generated by a network device with a RTP-based audio interface may be monitored and/or captured differently than an audio stream generated by a network device with a telephone-based audio interface.

Audio generator 350 may utilize the translated script command(s) 300 to format the captured audio stream 345 into a predetermined format. For example, audio generator 350 may format captured audio stream 345 into an eight bit, "8000" Hertz (Hz) pulse code modulation (PCM) stream. Audio generator 350 may also generate a formatted audio stream 355 for display to a user of ITP server 150, or may generate formatted audio stream 355 for display to a user of a client device (e.g., ITP client 120). For example, as audio generator 350 generates formatted audio stream 355, ITP server 150 may play and/or graphically display audio stream 355 to a user. Alternatively or additionally, as audio generator 350 generates formatted audio stream 355, ITP client 120 may receive audio stream 355, and may play and/or graphically display audio stream 355 to a user.

Audio analyzer 360 may, based on script command(s) 300, perform analyses on formatted audio stream 355. For example, audio analyzer 360 may perform a frequency analysis on audio stream 355 to display tones, multi-frequency (MF) (e.g., in-band signaling technique) digits, and/or dual-tone multi-frequency (DTMF) (e.g., signaling used for telephone signaling over a line in the voice-frequency band) digits provided by audio stream 355. Audio analyzer 360 may also check for signals and/or audio cues provided in audio stream 355, which may permit quick diagnosis of any problems encountered in a test, as well as rapid test case creation by the ITP system based on the generated audio cues.

Alternatively or additionally, audio analyzer 360 may be provided in ITP client 120, and ITP client 120 may perform the aforementioned analyses on audio stream 355 alone or in cooperation with ITP server 150.

Although FIG. 3 shows exemplary components of ITP server 150, in other implementations, ITP server 150 may contain fewer or additional components that may permit audio stream testing of a network (e.g., network 160) and/or a network device (e.g., communication device 110). In still other implementations, one or more components of ITP server 150 may perform the tasks performed by other components of ITP server 150.

Figure 4:
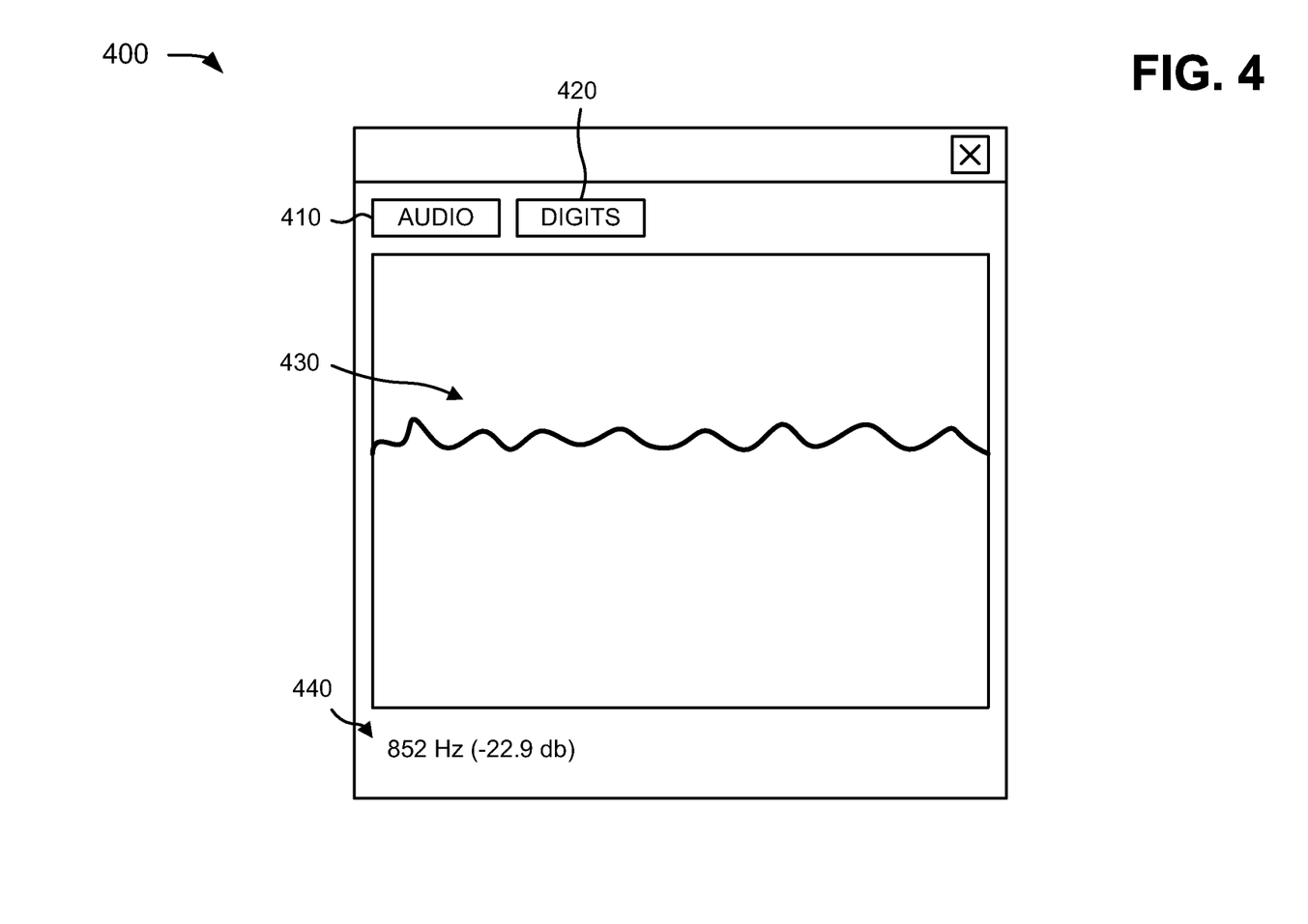
FIG. 4 is an exemplary diagram of a display capable of being presented by the ITP server and/or an ITP client of the exemplary network shown in FIG. 1.

FIG. 4 is an exemplary diagram of a display 400 capable of being presented by ITP server 150 and/or ITP client 120 (e.g., via a display). As shown, display 400 may include an audio item 410, a digits item 420, a graphical display 430, and a numerical display 440. Audio item 410 (e.g., an icon, link, button, and/or other similar selection mechanisms) may be selected when a user hovers over or clicks on audio item 410. If audio item 410 is selected, the audio stream (e.g., audio stream 355) may be played by ITP server 150 and/or ITP client 120 (e.g., via a speaker). Digits item 420 (e.g., an icon, link, button, and/or other similar selection mechanisms) may be selected when a user hovers over or clicks on digits item 420. If digits item 420 is selected, the numerical values associated with the audio stream (e.g., the frequency values of audio stream 355) may be displayed by ITP server 150 and/or ITP client 120. Graphical display 430 may provide a graph showing properties (e.g., frequency, loudness, etc.) of the audio stream (e.g., audio stream 355). Numerical display 440 may provide numerical properties (e.g., frequency, loudness, etc.) of the audio stream. For example, the audio stream shown in FIG. 4 may have a frequency of "852" Hz and a loudness of "−22.9" decibels (db).

Although FIG. 4 shows exemplary items of display 400, in other implementations, display 400 may contain fewer or additional items that permit analysis of properties of an audio stream.

Figure 5:
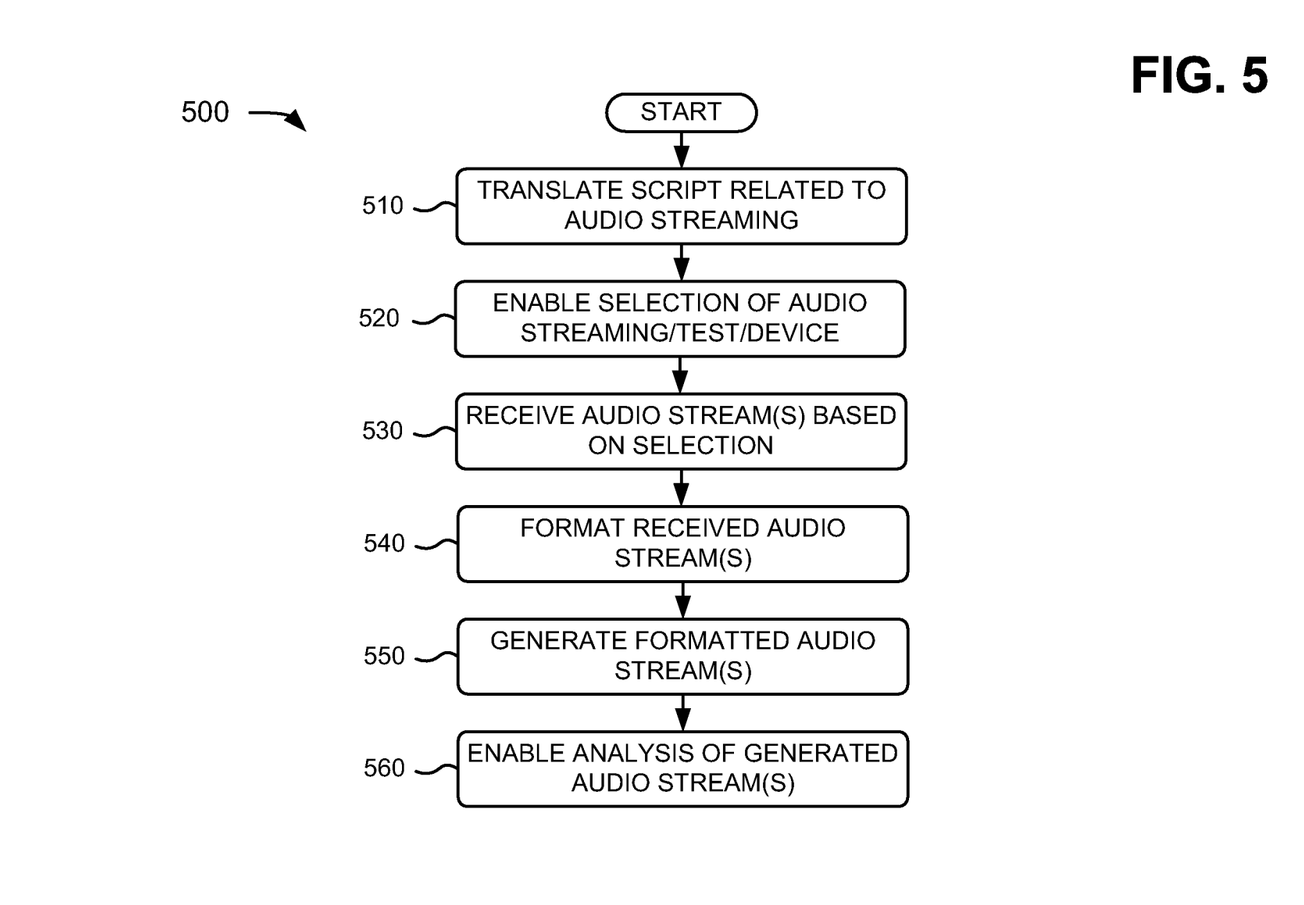
FIG. 5 is a flowchart of an exemplary process capable of being performed by the ITP server shown in FIG. 4.

FIG. 5 is a flowchart of an exemplary process 500 capable of being performed by ITP server 150. As shown, process 500 may translate script related to audio streaming (block 510). For example, in one implementation described above in connection with FIG. 3, script translator 310 may receive script command(s) 300 from the ITP system (e.g., from a script server (not shown) of the ITP system), and may translate script command(s) 300 into information capable of automatically generating and testing an audio stream with a network device, such as communication device 110. Script command(s) 300 may include commands for the creation of audio streaming-based test cases for, e.g., network 100. Script command(s) 300 may also define which physical devices of the network may be used, and may assign names to the physical devices. Script translator 310 may utilize database 320 to aid in the translation of script command(s) 300.

As further shown in FIG. 5, process 500 may enable selection of audio streaming, a test case, a device to test, etc. (block 520). For example, in one implementation described above in connection with FIG. 3, audio test selector 330 may enable a user to select what device (e.g., communication device 110) of network 100 to test, what test case to perform on the selected device, whether the user wants to hear an audio stream as part of the selected test case, etc. If the user wishes to hear the audio stream, audio test selector 330 may provide this information along with test case information to a script server of the ITP system, and the script server may generate script command(s) 300 corresponding to the audio stream and test case information. If the test is performed, audio test selector 330 may receive information about the device sending the audio stream. Audio test selector 330 may also enable ITP server 150 to connect directly or indirectly to the device sending the audio stream.

Process 500 may receive an audio stream(s) based on the selection(s) (block 530). For example, in one implementation described above in connection with FIG. 3, audio monitor 340 may utilize the translated script command(s) 300 to monitor and/or capture incoming real-time audio stream 345. Audio monitor 340 may also report audio stream 345 to other components of ITP server 150 to enable evaluation of audio stream 345.

As further shown in FIG. 5, process 500 may format the received audio stream(s) (block 540). For example, in one implementation described above in connection with FIG. 3, audio generator 350 may utilize the translated script command(s) 300 to format the captured audio stream 345 into a predetermined format (e.g., an eight bit, "8000" Hertz (Hz) pulse code modulation (PCM) stream).

Process 500 may generate the formatted audio stream(s) (block 550). For example, in one implementation described above in connection with FIG. 3, audio generator 350 may generate formatted audio stream 355 for display to a user of ITP server 150, or may generate formatted audio stream 355 for display to a user of a client device (e.g., ITP client 120). As audio generator 350 generates formatted audio stream 355, ITP server 150 and/or ITP client 120 may play and/or graphically display audio stream 355 to a user.

As further shown in FIG. 5, process 500 may enable analysis of the generated audio stream(s) (block 560). For example, in one implementation described above in connection with FIG. 3, audio analyzer 360 may, based on script command(s) 300, perform analyses on formatted audio stream 355. In one implementation, audio analyzer 360 may perform a frequency analysis on audio stream 355 to display tones, MF digits, and/or DTMF digits provided by audio stream 355. Audio analyzer 360 may also check for signals and/or audio cues provided in audio stream 355, which may permit quick diagnosis of any problems encountered in a test, as well as rapid test case creation by the ITP system based on the generated audio cues.

Figure 6:
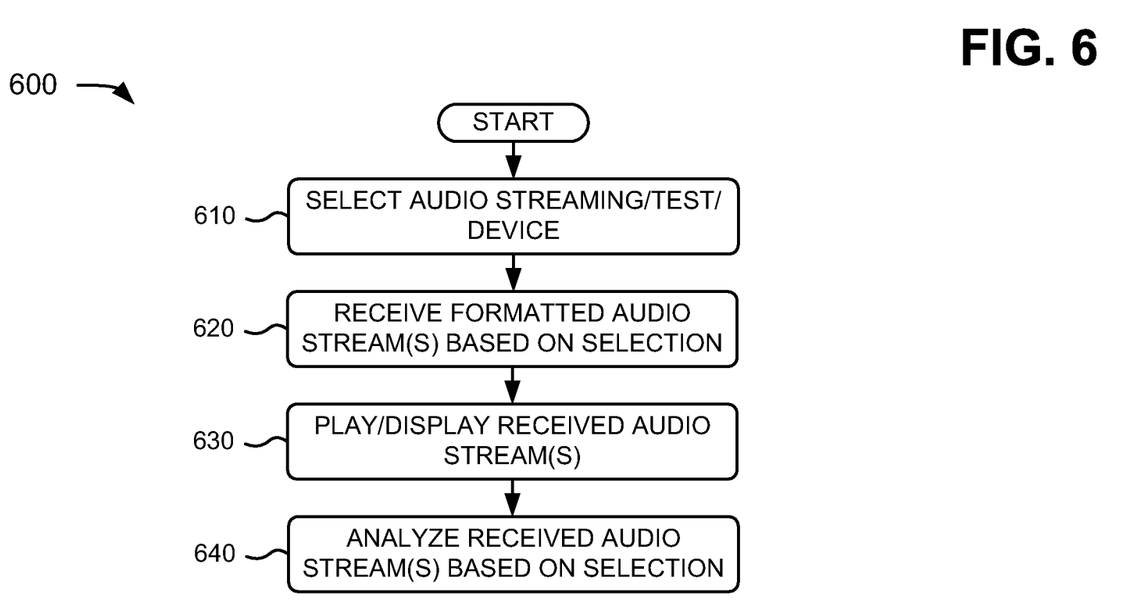
FIG. 6 is a flowchart of an exemplary process capable of being performed by the ITP client shown in FIG. 1.

FIG. 6 is a flowchart of another exemplary process 600 capable of being performed by ITP client 120. As shown, process 600 may enable selection of audio streaming, a test case, a device to test, etc. (block 610). For example, in one implementation described above in connection with FIG. 3, audio test selector 330 may be provided in ITP client 120 and may enable a user to select what device (e.g., communication device 110) of network 100 to test, what test case to perform on the selected device, whether the user wants to hear an audio stream as part of the selected test case, etc. If the user wishes to hear the audio stream, audio test selector 330 may provide this information along with test case information to a script server of the ITP system, and the script server may generate script command(s) 300 corresponding to the audio stream and test case information. If the test is performed, audio test selector 330 may receive information about the device sending the audio stream. Audio test selector 330 may also enable ITP client 120 to connect directly or indirectly to the device sending the audio stream.

As further shown in FIG. 6, process 600 may receive formatted audio stream(s) based on the selection(s) (block 620). For example, in one implementation described above in connection with FIG. 3, formatted audio stream 355 may be received by ITP client 120 for display to a user of ITP client 120.

Process 600 may play and/or display the received audio stream(s) (block 630). For example, in one implementation described above in connection with FIG. 3, as formatted audio stream 355 is received by ITP client 120, ITP client 120 may play and/or graphically display audio stream 355 to a user. In another implementation described above in connection with FIG. 4, ITP client 120 may provide display 400 that includes selectable audio item 410 that plays the audio stream (e.g., via a speaker), selectable digits item 420 that provides numerical values associated with the audio stream, graphical display 430 that provides a graph showing properties of the audio stream, and numerical display 440 that provides numerical properties of the audio stream.

As further shown in FIG. 6, process 600 may analyze the received audio stream(s) based on the selection(s) (block 640). For example, in one implementation described above in connection with FIG. 3, ITP client 120 may include audio analyzer 360 that may, based on script command(s) 300, perform analyses on formatted audio stream 355. In one implementation, audio analyzer 360 may perform a frequency analysis on audio stream 355 to display tones, MF digits, and/or DTMF digits provided by audio stream 355. Audio analyzer 360 may also check for signals and/or audio cues provided in audio stream 355, which may permit quick diagnosis of any problems encountered in a test, as well as rapid test case creation by the ITP system based on the generated audio cues.

Systems and methods described herein may provide automated audio streaming to permit near real-time functional testing of audio provided in a network and/or by communication devices within the network. The systems and methods may implement the automated audio streaming within an ITP system that may test the performance of the network. The automated audio streaming may permit a tester to hear signals and/or audio cues or prompts provided by the network and/or communication devices of the network being tested. This may permit quick diagnosis of any problems encountered in a test, as well as rapid test case creation by the ITP system based on the generated audio cues.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 5 and 6, the order of the acts may differ in other implementations consistent with the embodiments described herein. Further, non-dependent acts may be performed in parallel.

Embodiments, as described above, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "lone" or similar language is used. Further, the phrase "based on" is intended to mean "based, at least in part, on" unless explicitly stated otherwise.

What is claimed is:

1. A method comprising:
   receiving, with a device and from a client testing device, a selection of one or more network devices, of a plurality of network devices, to test;
   translating, with the device, a script command related to performing testing in a network, using audio streaming;
   allocating, with the device, call origination and termination resources in the network, based on the script command to test the selected one or more network devices;
   generating, with the device, an audio stream based on the translated script command; and
   transmitting, with the device, the generated audio stream to the selected one or more network devices to test the selected one or more network devices, where the client testing device and the selected one or more network devices are separate.

2. The method of claim 1, further comprising:
   enabling selection of an audio stream test case to perform on the network.

3. The method of claim 1, where the generating the audio stream comprises:
   receiving the audio stream, and
   formatting the received audio stream to a predetermined format, based on the translated script command, to form the generated audio stream.

4. The method of claim 3, where the formatting the received audio stream comprises:
   converting the received audio stream into a pulse code modulation audio stream.

5. The method of claim 1, where the script command includes a command for performing an audio stream test case on the network.

6. The method of claim 1, where the generating the audio stream comprises at least one of:
   playing the audio stream;
   displaying the audio stream; or
   formatting the audio stream to a predetermined format.

7. The method of claim 1, where the generating the audio stream comprises at least one of:
   displaying a frequency of the audio stream; or
   displaying a loudness of the audio stream.

8. The method of claim 1, further comprising:
   enabling analysis of the generated audio stream.

9. The method of claim 8, where the enabling analysis of the generated audio stream comprises at least one of:
   performing a frequency analysis on the generated audio stream to display one of tones, multi-frequency digits, or dual-tone multi-frequency digits provided by the generated audio stream; or
   checking for audio cues provided in the generated audio stream.

10. A device comprising:
    a script translator for translating a script command related to performing testing in a network, using audio streaming;
    a communication interface for:
       receiving, from a client testing device, a selection of one or more network devices, of a plurality of network devices, to test,
       connecting to call origination and termination resources to allocate the call origination and termination resources in the network, based on the script command, to test the selected one or more network devices,
       transmitting an audio stream to the selected one or more network devices to test the selected one or more network devices, where the client testing device and the selected one or more network devices are separate; and
    an audio generator for generating the audio stream based on the translated script to test the selected one or more network devices.

11. The device of claim 10, further comprising:
    an audio test selector for enabling selection of an audio stream test case to perform on the network.

12. The device of claim 10, further comprising:
    an audio monitor for receiving the audio stream, based on the translated script, to test the network.

13. The device of claim 12, where the audio generator formats the received audio stream to a predetermined format.

14. The device of claim 10, further comprising:
    an audio analyzer for analyzing the generated audio stream.

15. The device of claim 14, where the audio analyzer at least one of:
    performs a frequency analysis on the generated audio stream to display one of tones, multi-frequency digits, or dual-tone multi-frequency digits provided by the generated audio stream; or
    checks for audio cues provided in the generated audio stream.

16. The device of claim 10, further comprising:
    a display for displaying at least one of a frequency or a loudness of the generated audio stream.

17. A method comprising:
    detecting selection, with a device, of one or more network devices to be tested and an audio stream test case to perform on a network;
    allocating, with the device, call origination and termination resources to test the selected one or more network devices;
    receiving, from a testing server, an audio stream that was transmitted to the selected one or more network devices to test the selected one or more network devices based on the selection of the audio stream test case, where the device is separate from the selected one or more network devices; and playing, with the device, the received audio stream.

18. The method of claim 17, further comprising:

displaying the received audio stream.

19. The method of claim 18, where the displaying the received audio stream comprises at least one of:

displaying a graph of the received audio stream;

displaying a frequency of the received audio stream; or displaying a loudness of the received audio stream.

20. The method of claim 17, further comprising:

analyzing the received audio stream based on the selection.

21. The method claim 20, where the analyzing the received audio stream comprises at least one of:

performing a frequency analysis on the received audio stream to display one of tones, multi-frequency digits, or dual-tone multi-frequency digits provided by the received audio stream; or checking for audio cues provided in the received audio stream.

22. A system comprising:

a memory to store a plurality of instructions; and a processor to execute instructions in the memory to:

detect selection of at least one network device to be tested and an audio stream test case to perform on a network, allocate call origination and termination resources to test the selected at least one network device, receive, from a testing server, a real-time audio stream that is transmitted to the selected at least one network device to test the selected at least one network device based on the selection of the audio stream test case, where the system is separate from the selected at least one network device, and play the received audio stream.

23. The system of claim 22, where the processor further executes instructions in the memory to:

display the received audio stream.

24. The system of claim 22, where the processor further executes instructions in the memory to:

analyze the received audio stream based on the selection.

25. The system of claim 22, where the received audio stream is formatted to a predetermined format.

* * * * *